(12) United States Patent
Sugiura

(10) Patent No.: US 7,193,695 B2
(45) Date of Patent: Mar. 20, 2007

(54) SURVEY SYSTEM

(75) Inventor: Akinobu Sugiura, Ashigarakami-gun (JP)

(73) Assignee: Kabushiki Kaisya Sokkia, Atsugi (JP)

( * ) Notice: Subject to any disclaimer, the term of this patent is extended or adjusted under 35 U.S.C. 154(b) by 230 days.

(21) Appl. No.: 11/044,453

(22) Filed: Jan. 28, 2005

(65) Prior Publication Data

US 2005/0189469 A1   Sep. 1, 2005

(30) Foreign Application Priority Data

Jan. 30, 2004   (JP)   .............................. 2004-023614

(51) Int. Cl.
*G01B 11/26* (2006.01)
*G01C 1/00* (2006.01)

(52) U.S. Cl. .................. 356/141.3; 356/141.2
(58) Field of Classification Search ........... 356/139.07, 356/141.1–141.5
See application file for complete search history.

(56) References Cited

U.S. PATENT DOCUMENTS

| | | | | |
|---|---|---|---|---|
| 5,051,934 A | * | 9/1991 | Wiklund | .................. 356/152.3 |
| 5,313,409 A | * | 5/1994 | Wiklund et al. | ........... 356/4.01 |
| 5,440,112 A | * | 8/1995 | Sakimura et al. | ......... 250/203.1 |
| 6,016,455 A | * | 1/2000 | Ohtomo et al. | ................ 701/50 |
| 6,023,326 A | * | 2/2000 | Katayama et al. | ....... 356/141.3 |
| 7,055,253 B2 | * | 6/2006 | Kaneko | ........................ 33/290 |
| 2002/0093646 A1 | * | 7/2002 | Muraoka et al. | ......... 356/141.2 |

* cited by examiner

*Primary Examiner*—Thomas H. Tarcza
*Assistant Examiner*—Isam Alsomiri
(74) *Attorney, Agent, or Firm*—Westerman, Hattori, Daniels & Adrian, LLP.

(57) ABSTRACT

A survey system for transmitting guide light for instructing the direction of a target, the guide light having a wide range with small power. The survey system includes a target having a recursion reflector for reflecting light and a survey apparatus having an automatic collimation device for automatically coinciding the collimation axis of the recursion reflector with that of a telescope. The target includes a guide light transmitter for emitting guide light and scans a fan beam that is wide in the horizontal direction and narrow in the vertical direction in the vertical direction as guide light. The survey apparatus includes a direction detector for receiving guide light and detecting the direction of the guide light transmitter and also includes a collimation preparing device for turning the telescope roughly to the recursion reflector based on an output signal from the direction detector prior to commencing the automatic collimation.

9 Claims, 16 Drawing Sheets

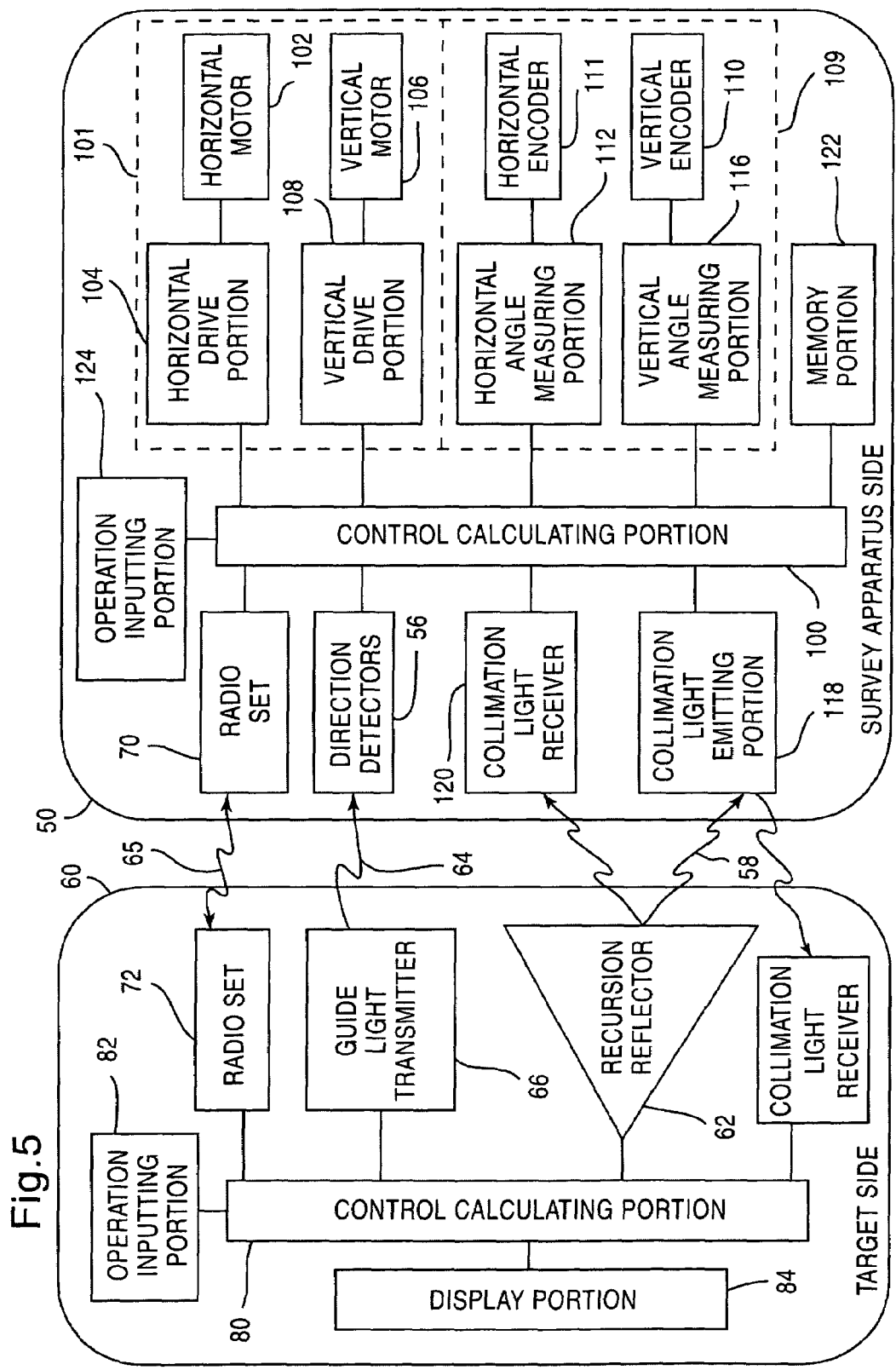

SURVEY SYSTEM

FIELD OF THE INVENTION

The present invention relates to a survey system capable of remotely controlling a survey apparatus from a target side.

BACKGROUND OF THE INVENTION

In order to measure the position, etc., of a measuring point by a survey apparatus such as a conventional total station (electronic type distance and angle measuring apparatus), it was necessary to collimate a target installed at the measuring point. Recently, in order to relieve labor for collimating a target and decrease errors in collimation due to the peculiarities of an operator, a survey apparatus has been released, which is provided with an automatic collimation device. The automatic collimation device automatically turns a telescope toward the direction of a target by emitting collimation light along the optical axis of the telescope of a survey apparatus, receiving the collimation light reflected by the target, and thus obtaining the direction of the target. The above-described collimation light includes modulation light. The survey apparatus provided with such an automatic collimation device is provided with a remote controller so that a survey can be carried out by a single person from a place apart from the survey apparatus body.

However, if a survey is carried out by using a survey apparatus provided with such an automatic collimation device on the basis of an instruction from the remote controller, since it is necessary to cause the telescope to scan a wide range in order to grasp a target in the visual field of the telescope, automatic collimation takes much time, wherein there is a problem in that the survey is not smoothly carried out.

In order to solve such a problem, a survey apparatus disclosed in Japanese Patent Publication No. 3075348 is known. FIG. 13 and FIG. 14 illustrate the survey apparatus disclosed in Japanese Patent Publication No. 3075348.

As shown in FIG. 13, the survey apparatus 11 is provided with light receiving units 25 and 26 for receiving signal light from a remote controller 27 on its front and back sides. The signal light is concurrently used as guide light by which the position of the remote controller 27 is informed. The respective light receiving units 25 and 26 are shaped like a pyramid as shown in FIG. 14, and are provided with four light receiving planes A, B, C and D.

As an operator who is in the vicinity of a reflection prism 23, such as a corner cube, etc., operates the remote controller 27 toward the survey apparatus, the signal light emitted from the remote controller 27 is made incident into the light receiving unit 25. If the top T of the light receiving unit 25 is turned toward the direction of the remote controller 27, the incident amounts of signal light into the four light receiving planes A, B, C and D become equal to each other. However, when the top T of the light receiving unit 25 is not faced toward the direction of the remote controller 27, the incident amounts of guide light into the four light receiving planes A, B, C and D do not become equal. Therefore, the direction of the remote controller 27 is calculated by comparing outputs from the four light receiving planes A, B, C and D with each other by means of controlling means (not illustrated), and the telescope 12 is turned toward the remote controller 27. As the collimation axis 0 of the telescope 12 is turned to the direction of the remote controller 27, that is, the direction of the reflection prism 23, an LED 31 secured on the front side of the survey apparatus 11 is turned on to inform the operator of this. After that, the telescope 12 can automatically pursue the direction of the reflection prism 23 by an automatic collimation device (not illustrated).

With the survey apparatus, since it is possible to quickly find the direction of the reflection prism 23 by the light receiving units 25 and 26 prior to automatic collimation, it is not necessary to find out the reflection prism 23 by causing a telescope, whose visual field is narrow, to scan a wide range, wherein the time required to finish collimation of the reflection prism 23 can be shortened, and a survey can be smoothly carried out.

However, in the survey apparatus 11 disclosed in Japanese Patent Publication No. 3075384, in order to securely carry out a one-man survey, it is necessary that the survey apparatus 11 can receive signal light (guide light) from a remote controller 27 even if the remote controller 27 and the survey apparatus 11 are not placed in front of each other. Therefore, it is necessary that signal light from the remote controller 27 is irradiated across a wide range, wherein there occurs a problem in that consumption power is increased, and there is another problem in that a range which can be surveyed with a one-man operation is made narrow since the arrival distance of the signal light is shortened if the consumption power is limited.

SUMMARY OF THE INVENTION

The present invention was developed in view of the above-described problems and addresses the above-described problems. It is therefore an object of the invention to provide a survey system capable of transmitting guide light to a sufficient distance in a wide range with small power in a survey system, in which guide light is emitted from a target side and is received by the survey apparatus side, capable of shortening the time required for automatic collimation by knowing a rough direction of the target.

In order to solve the above-described problems, a survey system in accordance with embodiments of the present invention comprises a target provided with a recursion reflector for reflecting light in a direction from which the light comes and a survey apparatus provided with an automatic collimating device for automatically coinciding the collimation axis of the recursion reflector with that of a telescope. The target is provided with a guide light transmitter for emitting guide light showing the direction of the guide light transmitter. The survey apparatus includes collimation preparing means having a direction detector for detecting the direction of the guide light transmitter by receiving the guide light and turning the telescope toward the direction of the recursion reflector on the basis of an output signal from the direction detector before starting the automatic collimating device, and the guide light transmitter scans a fan beam being wide in the width direction and narrow in the thickness direction in a direction differing from the width direction as guide light.

Since guide light showing the position of a target is a fan beam which is wide in the width direction and is narrow in the thickness direction, the guide light can arrive at a far point with only small power. Since the guide light scans in a direction differing from the width direction and irradiates a wide range, a direction detector provided in a survey apparatus securely receives the guide light and is able to detect the direction of the target even if the survey apparatus and target are not placed in front of each other, whereby it becomes possible to quickly turn the telescope almost toward the recursion reflector. As the telescope almost turns toward the recursion reflector, the recursion reflector can be thereafter accurately automatically collimated by the automatic collimation device, thereby automatically carrying out a survey.

In accordance with embodiments of the present invention, the guide light transmitter scans a fan beam being wide in the horizontal direction and having a vertically narrow width in a vertical direction as guide light, and the direction director is fixed on the survey apparatus body and is a horizontal direction detector that detects the horizontal direction of the guide light transmitter when turning the survey apparatus in the horizontal direction.

If the survey apparatus body is horizontally turned while a fan beam being wide in the horizontal direction and having a vertically narrow width scans in the vertical direction as guide light, the horizontal direction of the guide light transmitter is detected by the direction detector fixed on the survey apparatus body, and it becomes possible to quickly turn the telescope toward almost the direction of the recursion reflector with respect to the horizontal direction. After that, the recursion reflector is accurately collimated automatically by the automatic collimation device, and a survey can be automatically carried out.

In accordance with embodiments of the present invention, the survey apparatus emits collimation light from the automatic collimating device when the horizontal direction detector receives guide light from the guide light transmitter, and simultaneously turns the telescope vertically. The target includes a collimation light receiver for receiving the collimation light and a control calculation portion for controlling so as to turn on and off the guide light, which is emitted from the guide light transmitter, in response to an output from the corresponding collimation light receiver.

In accordance with embodiments of the present invention, it is possible to turn the telescope almost toward the direction of the recursion reflector with respect to the horizontal direction by horizontally turning the survey apparatus body. Herein, as collimation light is received by the collimation light receiver at the target side when the collimation light is emitted from the survey apparatus side and the telescope is vertically turned, the telescope and target are linearly connected to each other. At this time, guide light is emitted from the target side and is transmitted to the survey apparatus. As the survey apparatus receives the guide light, thereafter it causes the automatic collimation device to operate, the recursion reflector is automatically collimated, and a survey is automatically carried out. On the other hand, as the target is informed that the automatic collimation has operated, the target stops transmitting receiving the guide light, wherein it attempts to save power.

In accordance with embodiments of the present invention, the guide light transmitter scans a fan beam being wide in the horizontal direction and having a vertically narrow width in the vertical direction as guide light. The direction detector is fixed on the telescope axially supported on the survey apparatus so as to rotate vertically, and detects the horizontal direction of the guide light transmitter when horizontally turning the survey apparatus and detects the vertical direction of the guide light transmitter when vertically turning the telescope.

In accordance with embodiments of the present invention, it is possible to turn the telescope almost toward direction of the recursion reflector with respect to the horizontal direction by horizontally turning the survey apparatus body. Furthermore, by turning the telescope in the vertical direction, the direction detector detects the direction of the guide light transmitter with respect to the vertical direction, and it is possible to turn the telescope almost toward the direction of the recursion reflector with respect to the vertical direction. Thereafter, the recursion reflector is automatically collimated by the automatic collimation device and a survey is carried out.

In accordance with embodiments of the present invention, the target is connected to the survey apparatus by communication means.

Since it is possible to transmit and receive instruction signals by communication means even if the survey apparatus and target are not accurately placed in front of each other, it is possible to operate the survey apparatus even by a single operator from the target side. Further, it is possible to know the states of the survey apparatus located apart therefrom, wherein a survey can be carried out with the mind of the operator at ease.

In accordance with embodiments of the present invention, the guide light transmitter scans a fan beam being wide in the horizontal direction and having a vertically narrow width in the vertical direction as guide light. The direction detector is comprised of a horizontal direction detector, which is horizontally rotatably attached to the survey apparatus body, for detecting the horizontal direction of the guide light transmitter by turning in the horizontal direction, and a vertical direction detector, which is fixed on the telescope fixed on the survey apparatus body so as to rotate vertically, for detecting the vertical direction of the guide light transmitter when the telescope is vertically rotated. The target is comprised of a collimation light receiver for receiving collimation light emitted from the automatic collimation apparatus and a control calculation portion for stopping the guide light when the corresponding collimation light receiver receives the collimation light.

If guide light that vertically scans a fan beam being wide in the horizontal direction and narrow in the vertical direction is emitted from the target, and the horizontal direction detector is horizontally turned, the horizontal direction of the guide light transmitter is detected by the horizontal direction detector, and it is possible to turn the telescope roughly toward the recursion reflector with respect to the horizontal direction. Furthermore, if the telescope is turned in the vertical direction, the direction detector detects the direction of the guide light transmitter with respect to the vertical direction, and it is possible to turn the telescope almost toward the direction of the recursion reflector with respect to the vertical direction. After that, the recursion reflector is automatically collimated by the automatic collimation device, and a survey can be automatically carried out. Since the collimation light receiver receives collimation light at the target side when automatic collimation is commenced, it is found that distance and angle measurement is commenced without any hindrance. And, the guide light is turned off.

In accordance with embodiments of the present invention, since a fan beam being wide in the width direction and narrow in the thickness direction is scanned from the target side in a direction differing from the width direction as guide light, it is possible to transmit the guide light to a far place in a wide range with only small power, whereby it is possible to widely expand the range, in which a survey apparatus can be quickly and reliably remotely operated from the target side with small power, in a far range.

Further, in accordance with embodiments of the present invention, a fan beam being wide in the horizontal direction and narrow in the vertical direction is scanned in the vertical direction as guide light, the survey apparatus body is horizontally turned, at the same time, the horizontal direction of the guide light transmitter is detected by the direction detector fixed on the survey apparatus body, and collimation preparation is further carried out, by which the telescope is position-matched almost toward the recursion reflector with respect to the horizontal position, whereby the time required for automatic collimation can be shortened with only a simple procedure, and the time required for the entire survey operation can be shortened.

In accordance with embodiments of the present invention, by vertically turning the telescope along with emitting collimation light from the survey apparatus side, and receiving collimation light by the collimation light receiver at the target side, it is possible to match the position of the telescope with respect to the vertical direction. At this time, the collimation light receiver at the target side is able to receive more intensive collimation light than that of the collimation light receiver at the survey apparatus side, which receives collimation light reflected by the recursion reflector and coming therefrom, it is possible to securely match the position of the telescope with respect to the vertical direction without any error even if the distance between the survey apparatus and the target is long, the time required until automatic collimation is commenced can be shortened, and at the same time, the time required for the entire survey operation can be also shortened. Furthermore, since the collimation light is modulation light, there is another effect by which matching of the positions with respect to the direction can be accurately carried out without erroneous operations.

In accordance with embodiments of the present invention, the direction detector is fixed on the telescope. The position detector detects the horizontal direction of the guide light transmitter when the survey apparatus body is horizontally turned, and detects the vertical direction of the guide light transmitter when the telescope is vertically turned. And, by turning the telescope further near the direction of the recursion reflector before commencing automatic collimation, the time required for automatic collimation can be further shortened, and the time required for the entire survey operation can be also shortened.

In accordance with embodiments of the present invention, since the target and survey apparatus are connected by communication means, it is possible to freely transmit and receive instruction signals and data therebetween. A reliable survey can be carried out while checking the states of a survey apparatus located apart from a target and the results of a survey.

In accordance with embodiments of the present invention, since the horizontal direction of the guide light transmitter can be further quickly detected by horizontally turning a small horizontal direction detector, and the vertical direction of the guide light transmitter is detected by the vertical direction detector fixed on the telescope by turning the telescope in the vertical direction, the telescope can be turned almost toward the direction of the recursion reflector. Therefore, it shortens the time required for automatic collimation and makes it possible to further shorten the time required for the entire survey operation. In addition, since no radio communication is employed between the survey apparatus and target, it is possible to utilize the survey system even in an environment where electromagnetic noise exists.

BRIEF DESCRIPTION OF THE DRAWINGS

Preferred embodiments of the present invention will be described with reference to the accompanying drawings, of which:

FIG. 5 is a block diagram showing the survey system according to the second embodiment of the invention.

DETAILED DESCRIPTION OF THE INVENTION

Figure 1:
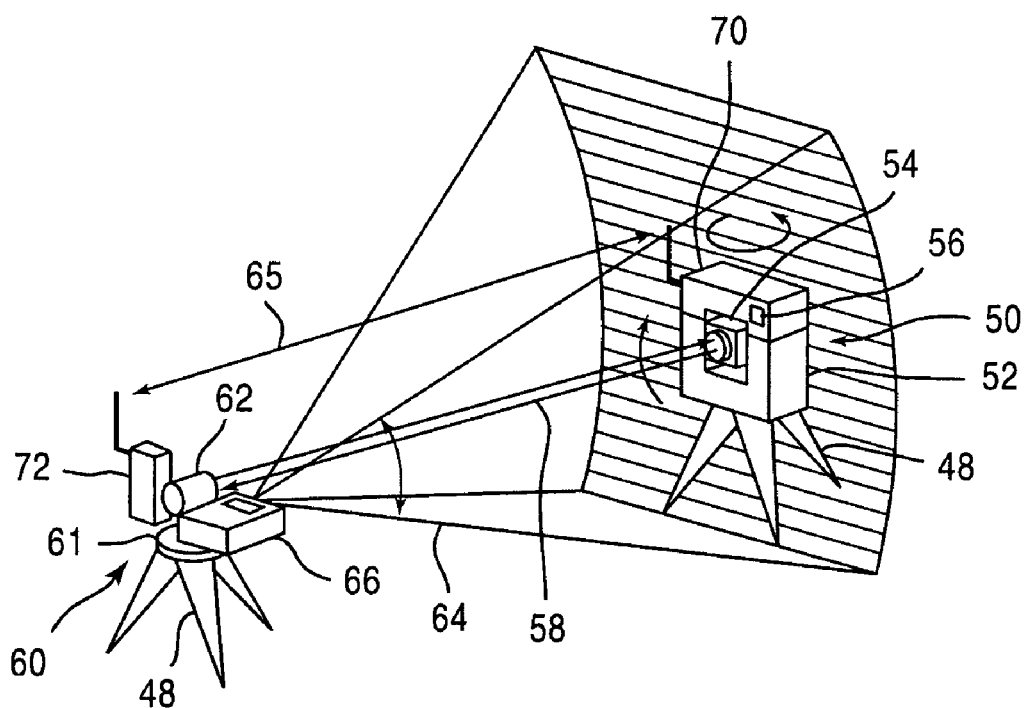
FIG. 1 is a view showing the outline of a survey system according to a first embodiment of the invention.

Reference will now be made in detail to the preferred embodiments of the present invention, examples of which are illustrated in the accompanying drawings, wherein like reference numerals refer to like elements throughout.

Figure 2:
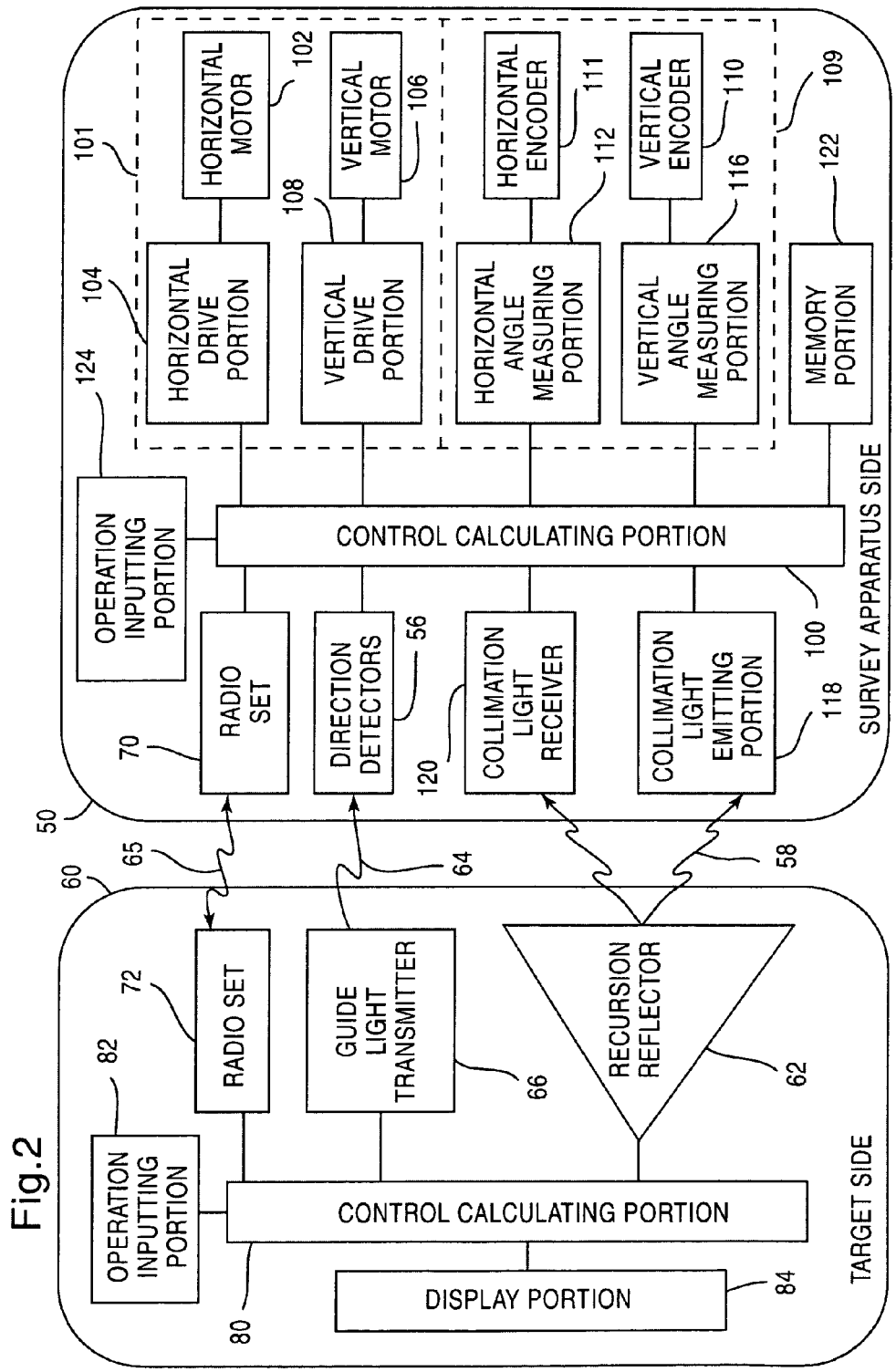
FIG. 2 is a block diagram showing the survey system according to the first embodiment.
Figure 3A:
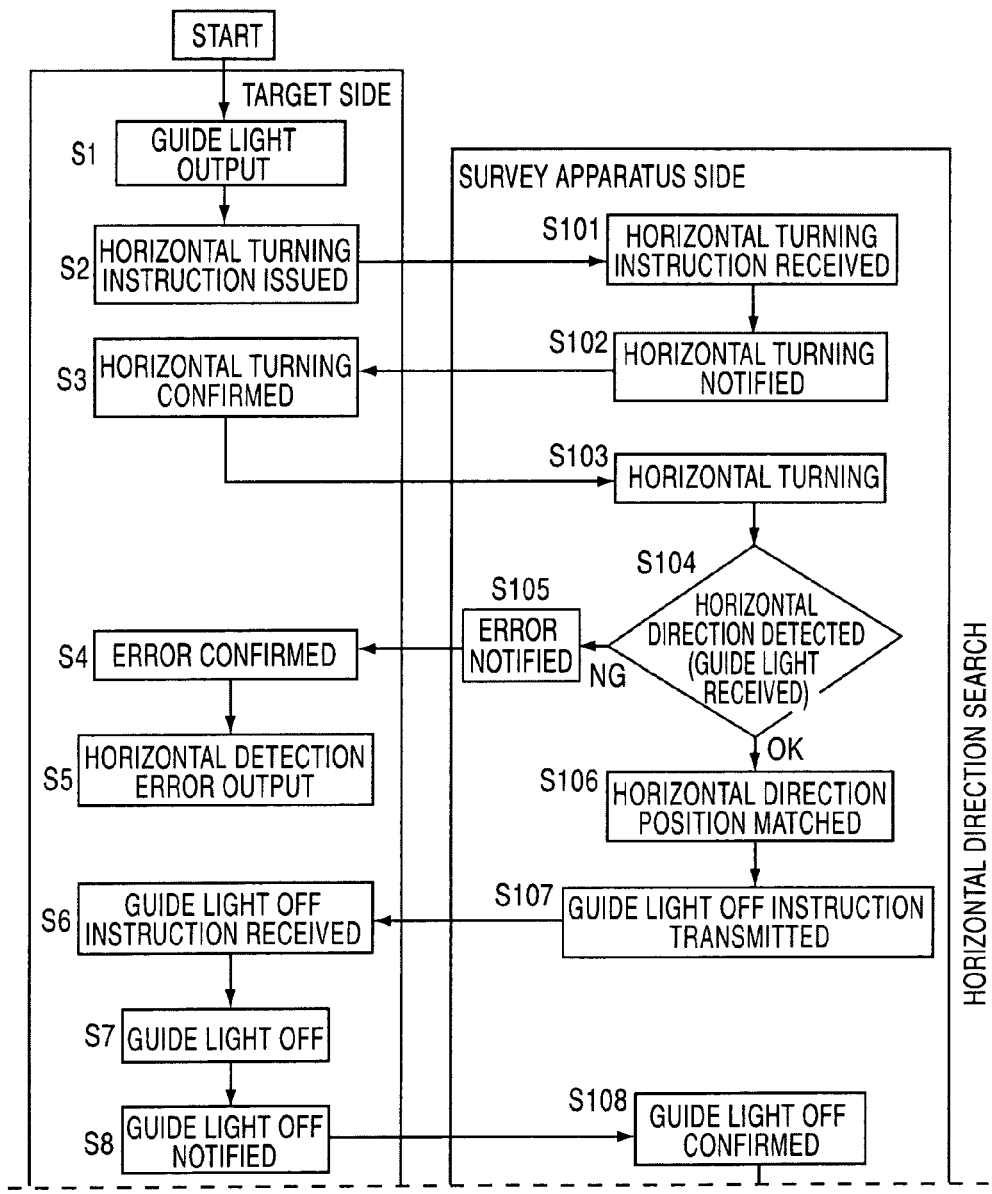
FIGS. 3A and 3B are a flow chart describing movements of the survey system according to the first embodiment of the present invention.
Figure 3B:
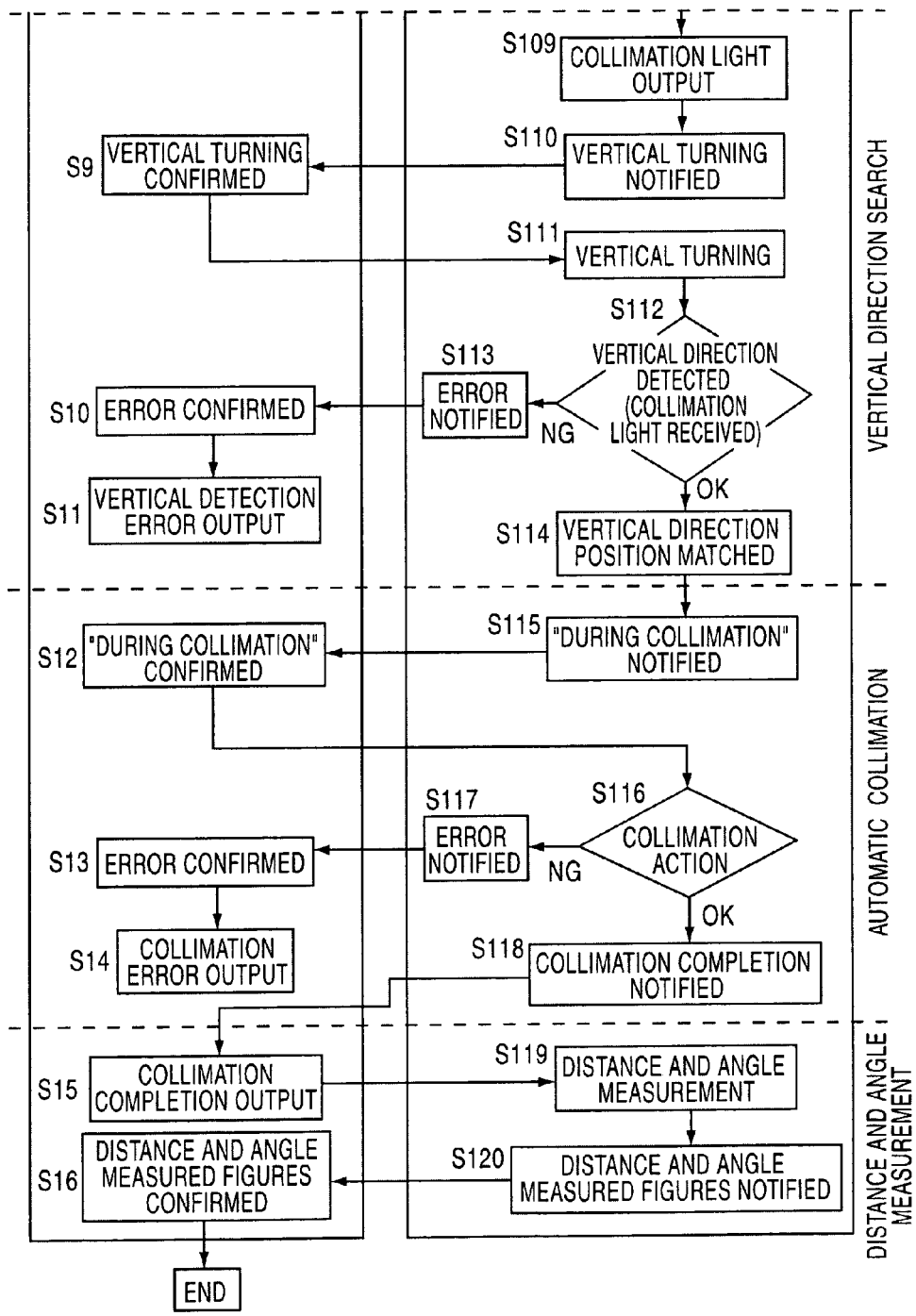

First, a description is given of a first embodiment of the present invention with reference to FIG. 1 through FIGS. 3A and 3B. FIG. 1 is a view showing an outline of a survey system according to the first embodiment. FIG. 2 is a block diagram of the survey system, and FIGS. 3A and 3B are a flow chart showing the movements of the survey system.

As shown in FIG. 1, a survey system the first embodiment of the invention comprises a survey apparatus 50 provided with an automatic collimation device and a target 60 provided with a recursion reflector 62, such as a reflection prism, which reflects light in its incoming direction. The survey apparatus 50 is provided with a survey apparatus body 52, which can horizontally turn, on a leveling-up table 61 fixed on a tripod 48, and a telescope 54, which can vertically turn, on the survey apparatus body 52. The target 60 is provided, on the leveling-up table 61 fixed on the tripod 48, with a recursion reflector 62 for reflecting collimation light emitted from the survey apparatus 50 toward the survey apparatus 50 and a guide light transmitter 66 for emitting guide light 64, which informs the direction of the recursion reflector 62, toward the survey apparatus 50. The above-described collimation light includes modulation light.

The guide light 64 is scanned in the vertical direction with a fan beam (fan-shaped beam) being narrow in the vertical direction and wide in the horizontal direction. It is preferable that the width of the guide light 64 in the horizontal direction is approximately ±5 degrees, and the scanning width in the vertical direction is approximately ±10 degrees.

The survey apparatus 50 and target 60 are, respectively, provided with radio sets 70 and 72 for transmitting and receiving instruction signals and results of survey, etc., by means of radio signals 65. Also, the survey apparatus body 52 of the survey apparatus 50 is provided with a direction detector 56 for detecting the direction of guide light 64 of the guide light transmitter 66.

The direction detector 56 according to the present embodiment is provided with a cylindrical lens (not illustrated), one rectangular light receiving sensor and slits for limiting the horizontal light receiving range along the vertical direction, and is devised so that it can detect the direction of the guide light transmitter 66 even if there is an error in height between the survey apparatus 50 and target 60. In addition, since the direction director 56 is located outside the scanning range of the guide light 64 when the survey apparatus 50 is near the target 60 and an error in height therebetween is large, the scanning direction may be caused to slip stepwise in the vertical direction in such a case. And, the direction detector 56 is fixed on the survey apparatus body 52. When the survey apparatus body 52 is horizontally turned, and it receives the guide light 64, the direction detector 56 detects the horizontal direction of the guide light transmitter 66 (light source).

Next, a description of the internal structure of the survey apparatus 50 and target 60 of the survey system will be provided with reference to FIG. 2.

The survey apparatus 50 includes a drive portion 101 for turning the telescope 54 toward the recursion reflector 62, a measuring portion 109 for measuring the horizontal angle and vertical angle of the telescope 54, a collimation light emitting portion 118 for emitting collimation light 58 to the recursion reflector 62, a collimation light receiver 120 for receiving the collimation light 58 reflected by the recursion reflector 62, a memory portion 122 for storing data such as measurement values, etc., and a control calculating portion 100, such as a central processing unit (CPU) connected to the drive portion 101, the collimation light emitting portion 118, the measuring portion 109, the collimation light receiver 120 and the memory portion 122. Also, the control calculating portion 100 is devised so that various instructions and data can be inputted from an operation inputting portion 124 thereinto.

The above-described drive portion 101 comprises a horizontal motor 102 for horizontally turning the survey apparatus body 52, a vertical motor 106 for vertically turning the telescope 54, and a horizontal drive portion 104 and a vertical drive portion 108 for supplying a drive current to both the motors 102 and 106, respectively. The above-described measuring portion 109 comprises a horizontal encoder 111 that horizontally turns along with the survey apparatus body 52, a vertical encoder 110 that vertically turns along with the telescope 54, a horizontal angle measuring portion 112 and a vertical angle measuring portion 116 for respectively reading the turning angles of both the encoders 111 and 110, and a distance measuring portion (not illustrated).

In addition, the survey apparatus 50 is provided with an automatic collimation device for automatically turning the optical axis (collimation axis) of the telescope 54 toward the recursion reflector 62. The automatic collimation device comprises the control calculating portion 100, the collimation light emitting portion 118, the collimation light receiver 120 and the drive portion 101. The collimation light is emitted from the collimation light emitting portion 118, the collimation light 58 reflected from the recursion reflector 62 and returned therefrom is received by the collimation light receiver 120, the direction of the recursion reflector 62 is judged by the control calculating portion 100, and the drive portion 101 is controlled so as to turn the optical axis of the telescope 54 toward the recursion reflector 62.

Since the internal structure of the survey apparatus 50 described above is the same as the total station provided with a prior art automatic collimation device except the function of the control calculation portion 100, any further description is omitted.

The survey apparatus 50 according to the present embodiment is further provided with collimation preparing means for turning the telescope 54 toward the recursion reflector 62 again before commencing the automatic collimation device. The collimation preparing means according to the present embodiment may comprise a direction detector 56, a radio set 70, the drive portion 101 and the control calculating portion 100 connected thereto. The telescope 54 is turned toward the guide light transmitter 66 on the basis of an output signal from the direction detector 56, and when it is judged that the telescope 54 has been turned roughly toward the direction of the recursion reflector 62, the automatic collimation device is started.

The target 60 according to the present embodiment is provided with a control calculating portion 80 connected to the guide light transmitter 66 and the radio 70 in addition to the recursion reflector 62, guide light transmitter 66, and radio 72. An operation inputting portion 82 for inputting various instructions and data, and a display portion 84 for displaying the states of the target 60 and those of the survey apparatus 50 are further connected to the control calculating portion 80. Both the radios 70 and 72 are provided with a non-directivity antenna so that, even if the survey apparatus 50 and the target 60 are not placed in front of each other, they can communicate with each other, wherein communications are available by means of electric waves 65.

A description of movements of the survey system according to the present embodiment will now be provided with reference to the flow chart of FIGS. 3A and 3B.

When the survey system according to the embodiment is started, the target 60 advances to Step S1, wherein guide light 64 is emitted from the guide light transmitter 66. Next, the target 60 advances to Step S2, wherein it transmits a horizontal turning instruction signal for horizontally turning the survey apparatus body 52 toward the survey apparatus 50. Then, the survey apparatus 50 receives the horizontal turning instruction signal in Step S101 and advances to the next step S102, wherein it transmits a notice of horizontal turning commencement to the target 60. The target 60 is informed, by confirming the horizontal turning of the survey apparatus body 52 in Step S3, that the survey apparatus 50 starts a horizontal direction search of the guide light transmitter 66.

The survey apparatus 50 advances to Step S103 and the survey apparatus body 52 is horizontally turned. Next, the survey apparatus 50 advances to Step S104, wherein it receives the guide light 64 and detect the horizontal direction of the guide light transmitter 66. When the survey apparatus 50 does not receive the guide light 64 for a prescribed period of time, it advances to Step S105, wherein the survey apparatus 50 transmits an error notice to the target 60. When the target 60 confirms the error notice in Step S4, it advances to Step S5, wherein the target 60 displays a detection error of the horizontal direction on the display portion 84 and stops its movement.

When the survey apparatus 50 receives the guide light 64 in Step S104, the survey apparatus 50 advances to Step S106, wherein the horizontal direction position of the telescope 54 is matched to the guide light transmitter 66, and the horizontal turning of the survey apparatus body 52 is stopped. Continuously, the survey apparatus 50 advances to Step S107 where it transmits a guide light OFF instruction to the target 60. When the target 60 receives the guide light OFF instruction in Step S6, it is found that the horizontal direction search of the guide light transmitter 66 is completed in the survey apparatus 50. Therefore, the target 60 advances to Step S7, wherein the guide light 64 are turned off, and it advances to Step S8, wherein a guide light OFF notice is transmitted to the survey apparatus 50.

When the survey apparatus 50 confirms a guide light OFF notice in Step S108, it advances to Step S109, where the survey apparatus 50 emits collimation light 58, and the survey apparatus 50 continuously advances to Step S110, wherein it transmits a notice of vertical turning commencement of the telescope 54 to the target 60. When the target 60 confirms the vertical turning notice in Step S9, it is found that the survey apparatus 50 has commenced vertical direction search of the recursion reflector 62. On the other hand, the survey apparatus 50 advances to Step S111, wherein it vertically turns the telescope 54 and continues the vertical direction search of the recursion reflector 62.

Next, the survey apparatus 50 advances to Step S112, wherein it detects the vertical direction of the recursion reflector 62 by emitting collimation light 58 and receiving the collimation light 58 reflected by the recursion reflector 62 and returned therefrom. When the survey apparatus 50 cannot receive the collimation light 58, the survey apparatus 50 advances to Step S113, wherein it transmits an error notice to the target 60. The target 60 advances to Step S11 when it confirms the error notice in Step S10, and displays the vertical direction detection error on the display portion 84 and stops its operation.

When the survey apparatus 50 receives the collimation light 58 in Step S112; it advances to Step S114, wherein the survey apparatus 50 stops the telescope 54 by matching the telescope 54 to the position of the recursion reflector 62 in the vertical direction. Continuously, the survey apparatus 50 advances to Step S115, commences a collimation movement, and informs the target 60 that the survey apparatus is in collimation. The target 60 is informed that an automatic collimation device is started in the survey apparatus 50, by confirming, in Step S12, that the survey apparatus is in collimation. On the other hand, the survey apparatus 50 advances to Step S116 and continues an automatic collimation movement.

If collimation is not satisfactorily carried out in Step S116, the survey apparatus 50 advances to Step S117, and transmits an error notice to the target 60. The target 60 advances to Step S14 when the target 60 confirms the error notice in Step S13, and outputs a collimation error to the display portion 84 and stops its operation. When collimation is satisfactorily carried out in Step S116, the survey apparatus 50 advances to Step S118, and transmits a collimation completion notice to the target 60. With this, the target 60 is informed in Step S15 that automatic collimation has been completed in the survey apparatus 50.

The survey apparatus 50 advances to Step S119, and carries out measurement with respect to the distance and angle. Continuously, the survey apparatus 50 advances to Step S120, and informs the target 60 of the distance-measured figure and angle-measured figure. The target 60 displays the results of measurement such as the distance-measured figure and angle-measured figure on the display portion 84 when the target 60 confirms the distance-measured figure and angle-measured figure in Step S16.

Further, when the survey system is stopped by an error, the survey system may be re-started after removing the cause of the error.

In the present embodiment, since the guide light 64 is a fan beam which is wide in the horizontal direction and narrow in the vertical direction, it is possible for the guide light 64 to reach at a far distance with small power, and even if the survey apparatus 50 and recursion reflector 62 are not placed in front of each other since the guide light is scanned in the vertical direction and is irradiated in a wide range in the vertical and left and right directions, the direction detector 56 attached to the survey apparatus 50 securely receives the guide light 64, and collimation preparation can be carried out, which turns the telescope 54 almost toward the direction of the recursion reflector 62 in advance before commencing automatic collimation. If such collimation preparation is carried out, the time required for automatic collimation can be shortened, and the time required for the entire survey operation can be also shortened.

Figure 4:
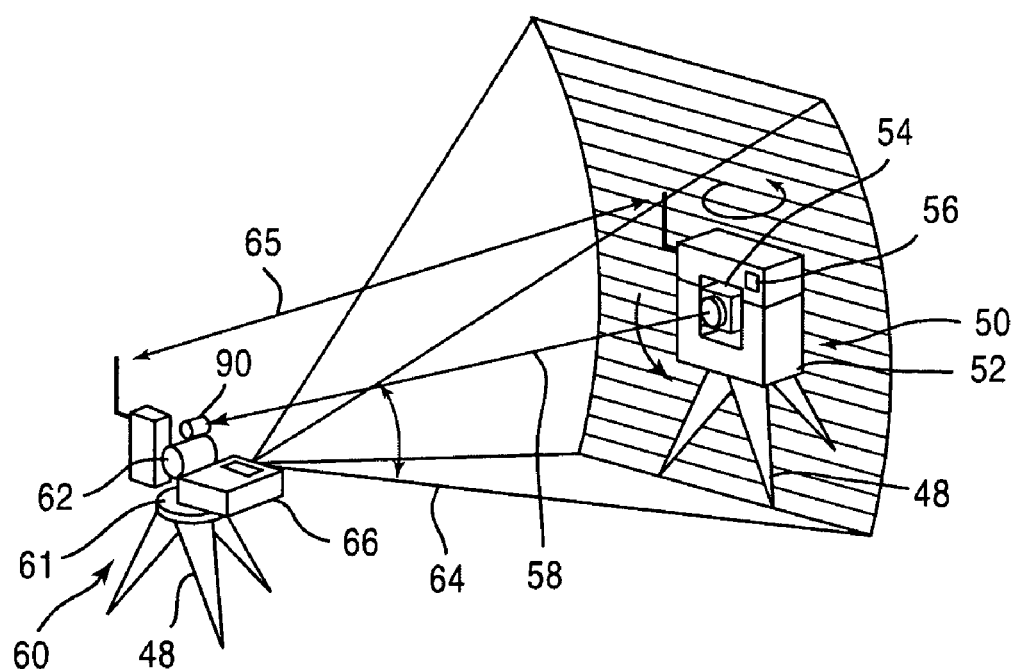
FIG. 4 is a view showing the outline of a survey system according to a second embodiment of the invention.
Figure 6A:
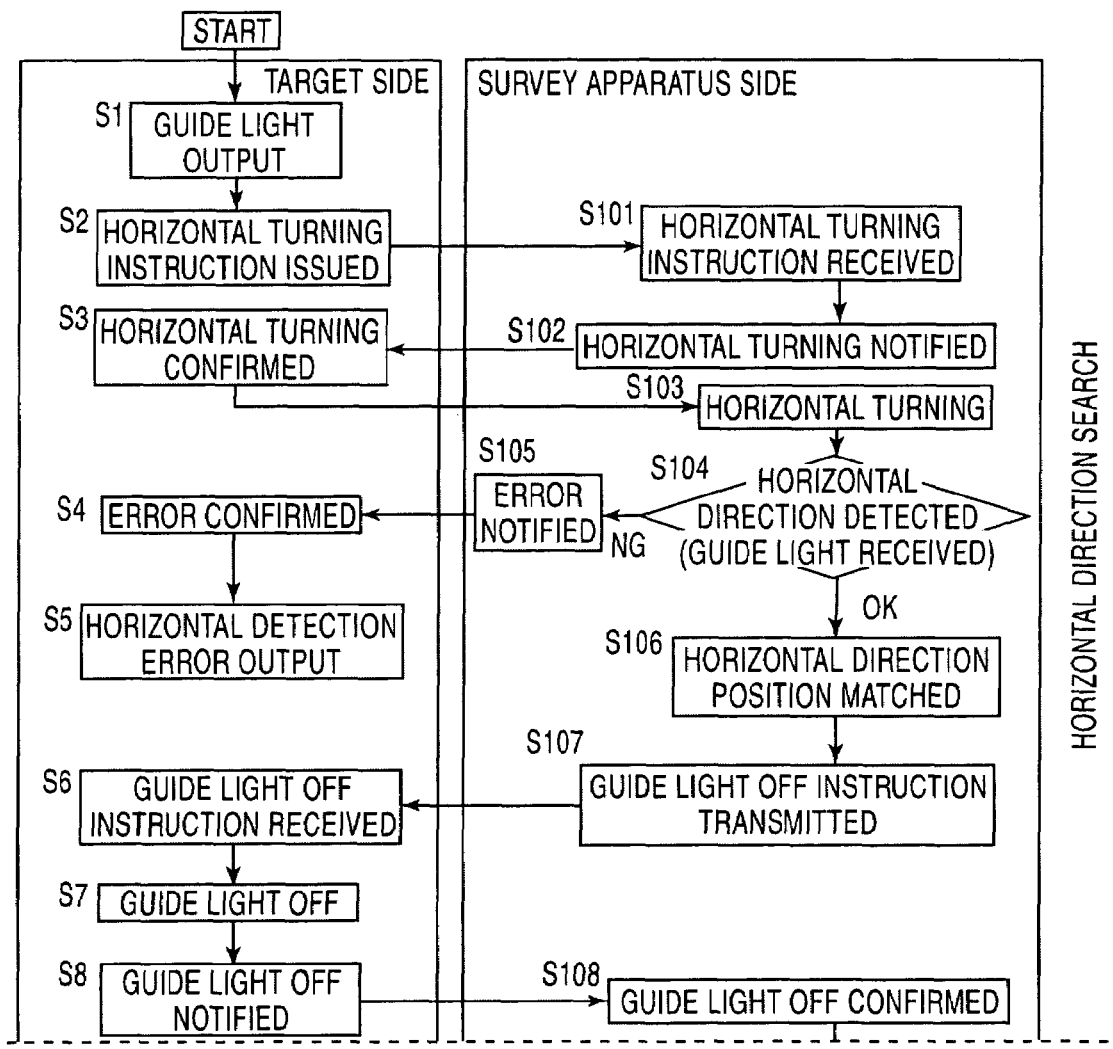
FIGS. 6A and 6B are a flow chart describing movements of the survey system according to the second embodiment of the invention.
Figure 6B:
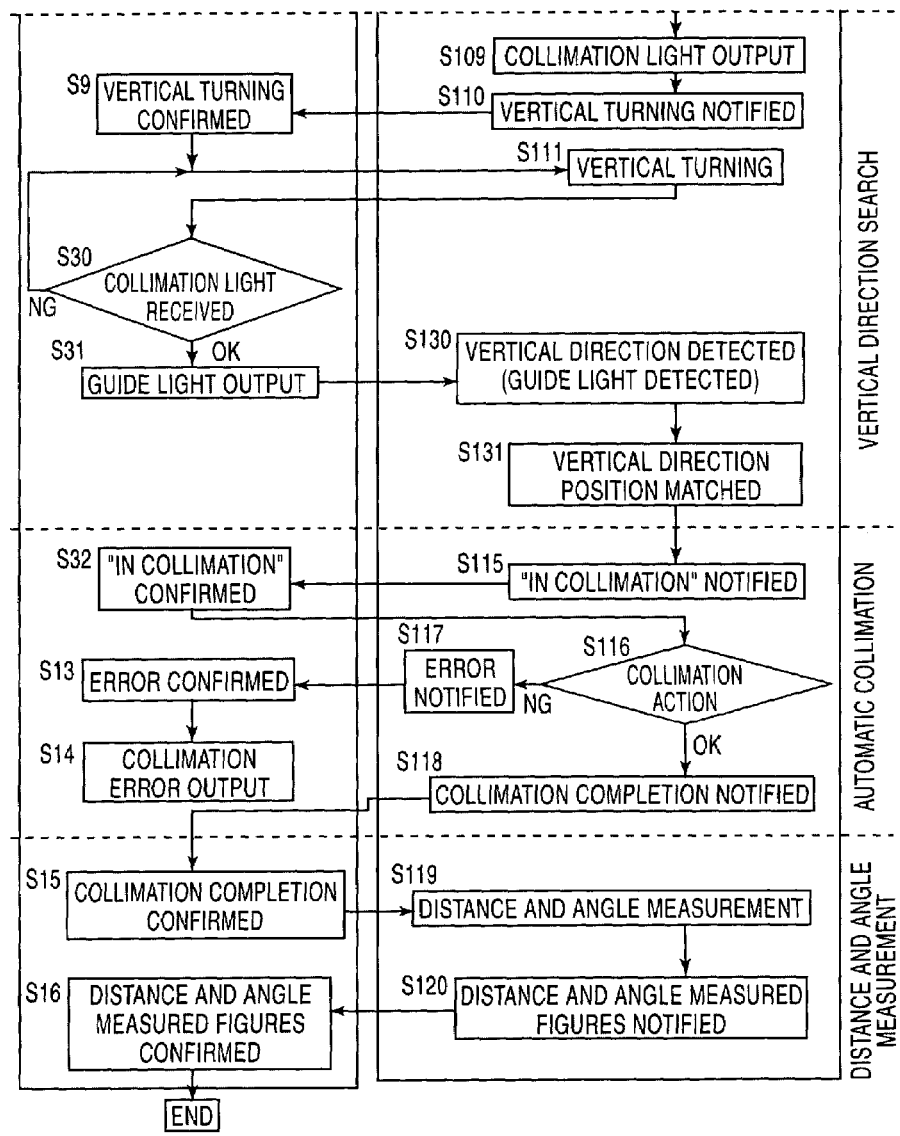

Next, a second embodiment of the present invention will be described below with reference to FIG. 4 through FIGS. 6A and 6B. FIG. 4 is a view showing the outline of a survey system according to the present embodiment. FIG. 5 is a block diagram showing the survey system. FIGS. 6A and 6B are a flow chart describing movements of the survey system.

As shown in FIG. 4 and FIG. 5, the survey system according to the present embodiment differs from the above-described first embodiment in that a collimation light receiver 90 for detecting the vertical direction is provided at the target 60 side. The second embodiment is the same as the first embodiment excepting this point. Therefore, in FIG. 4 and FIG. 5, parts which are the same as those described with respect to the first embodiment are referred to by the same reference numbers. A detailed description of the parts which are the same will not be repeated here. In addition, the steps shown in the flow chart of FIGS. 6A and 6B are the same as those in the first embodiment shown in FIGS. 3A and 3B, except for the operations between Step S9 and Step S32 in the target 60 and the operations between Step S111 and S115 in the survey apparatus 50.

A description of movements of the survey system according to the present embodiment will now be provided with reference to FIGS. 6A and 6B. The steps from the beginning to Step 111 are the same as those in the first embodiment.

Next, if the telescope 54 is vertically turned in Step S111, the target 60 judges in Step S30 whether or not it receives the collimation light 58. When no collimation light 58 is received, the process returns to Step S111, and the telescope 54 continues vertical turning. When the collimation light 58 is received, the process advances to Step S31, wherein the target 60 emits guide light from the guide light transmitter 66.

Next, the survey apparatus 50 reads the angle of the telescope 54 in the vertical direction when it receives the guide light by the direction detector 56 in Step S130, and the survey apparatus 50 advances to Step S131, wherein it confirms that the position in the vertical direction is roughly matched, and collimation preparation has been completed. Continuously, the survey apparatus 50 advances to Step S115, and transmits a notice of a collimation movement commencement to the target 60. When the target 60 confirms the notice of collimation movement commencement in Step S32, it is informed that the collimation preparation has been completed and the automatic collimation device has started. Then, the guide light 64 is turned off. Hereinafter, the survey apparatus 50 advances to Step S116. Subsequent processes are the same as those in the above-described first embodiment.

In the present embodiment, since the collimation receiver 90 at the target 60 side receives collimation light 58 transmitted from the survey apparatus 50 side, the collimation receiver 90 is able to receive more intensive collimation light 58 than that of collimation light receiver 120 at the survey apparatus 50 side according to the first embodiment. Therefore, the positions of the survey apparatus 50 and the target 60 can be securely matched to each other in the vertical direction thereof even if the distance therebetween is long, wherein the time required to start automatic collimation can be shortened, and the time required for the entire survey operation can be also shortened. Since the collimation light is modulation light, it is possible to accurately match the positions with respect to the direction without any erroneous operation.

Figure 7:
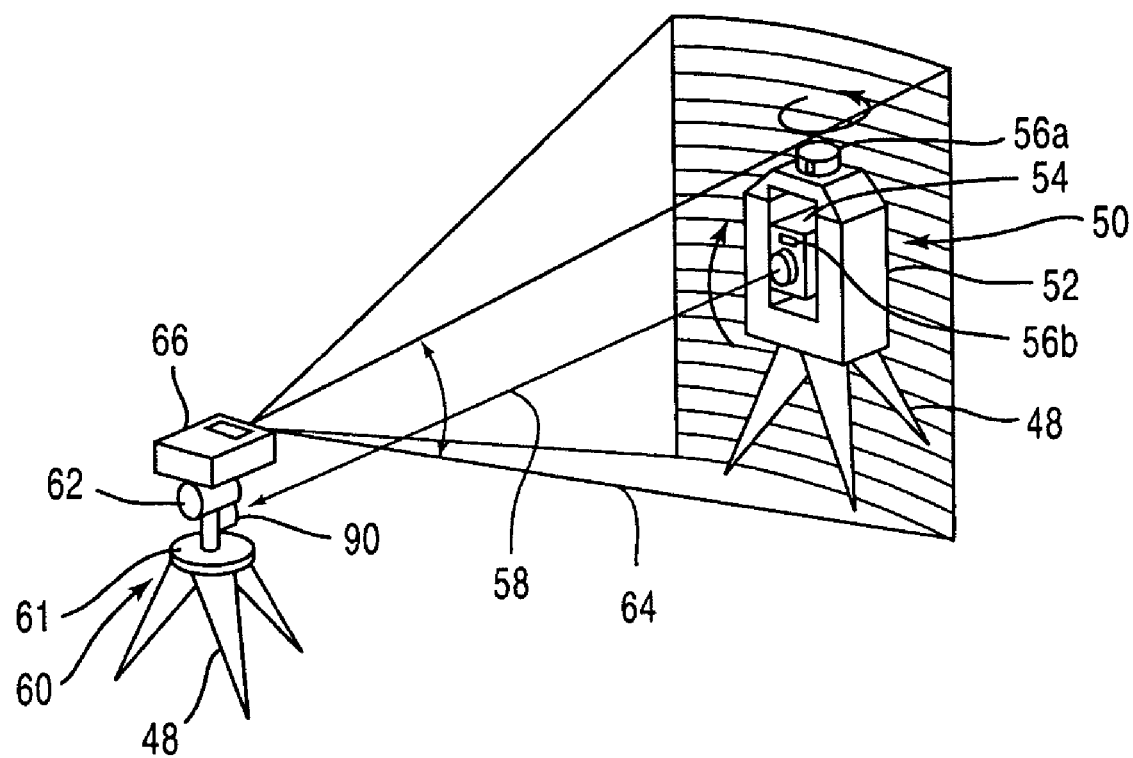
FIG. 7 is a view showing the outline of a survey system according to a third embodiment of the invention.
Figure 8:
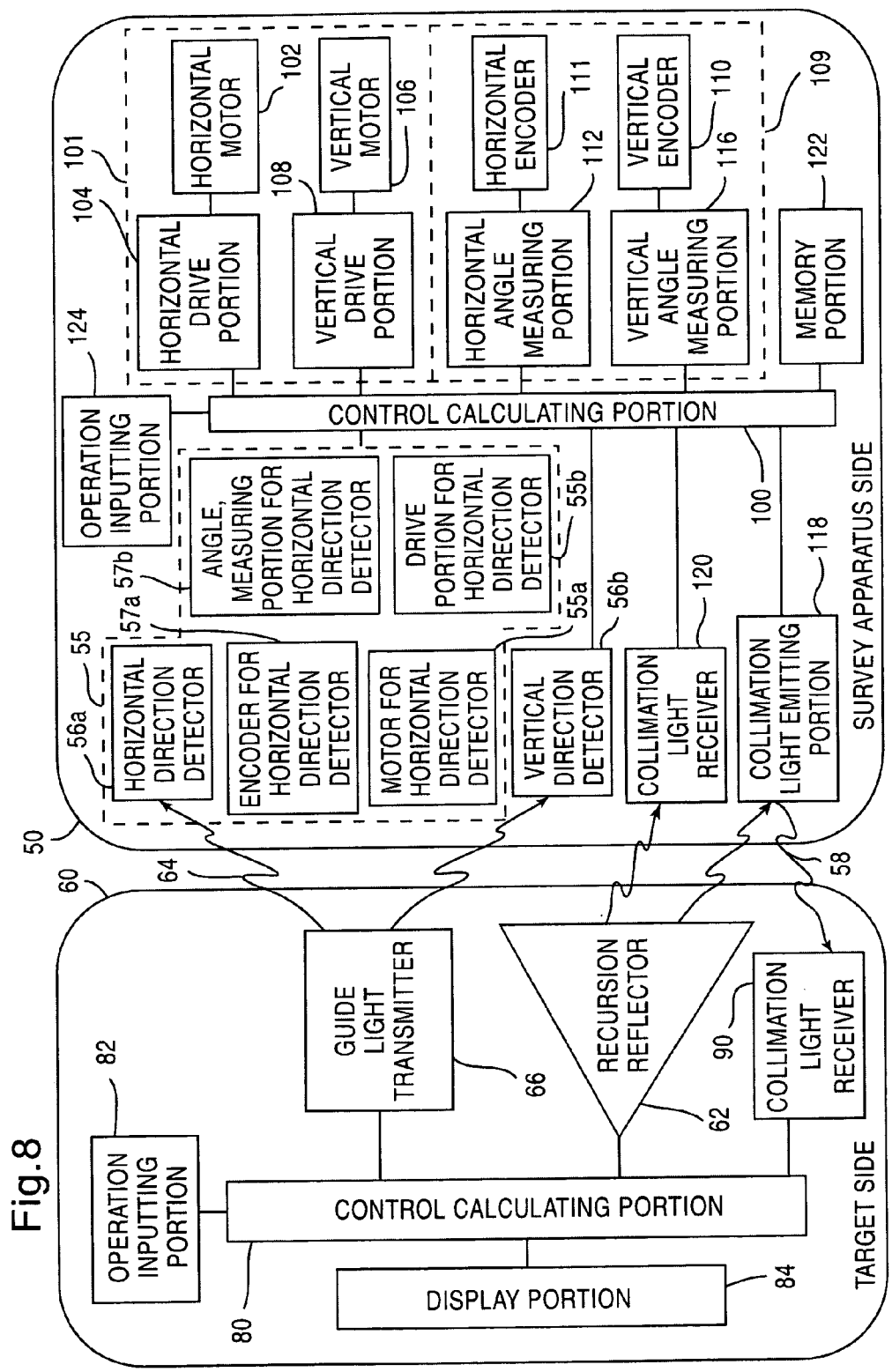
FIG. 8 is a block diagram showing the survey system according to the third embodiment of the invention.
Figure 9:
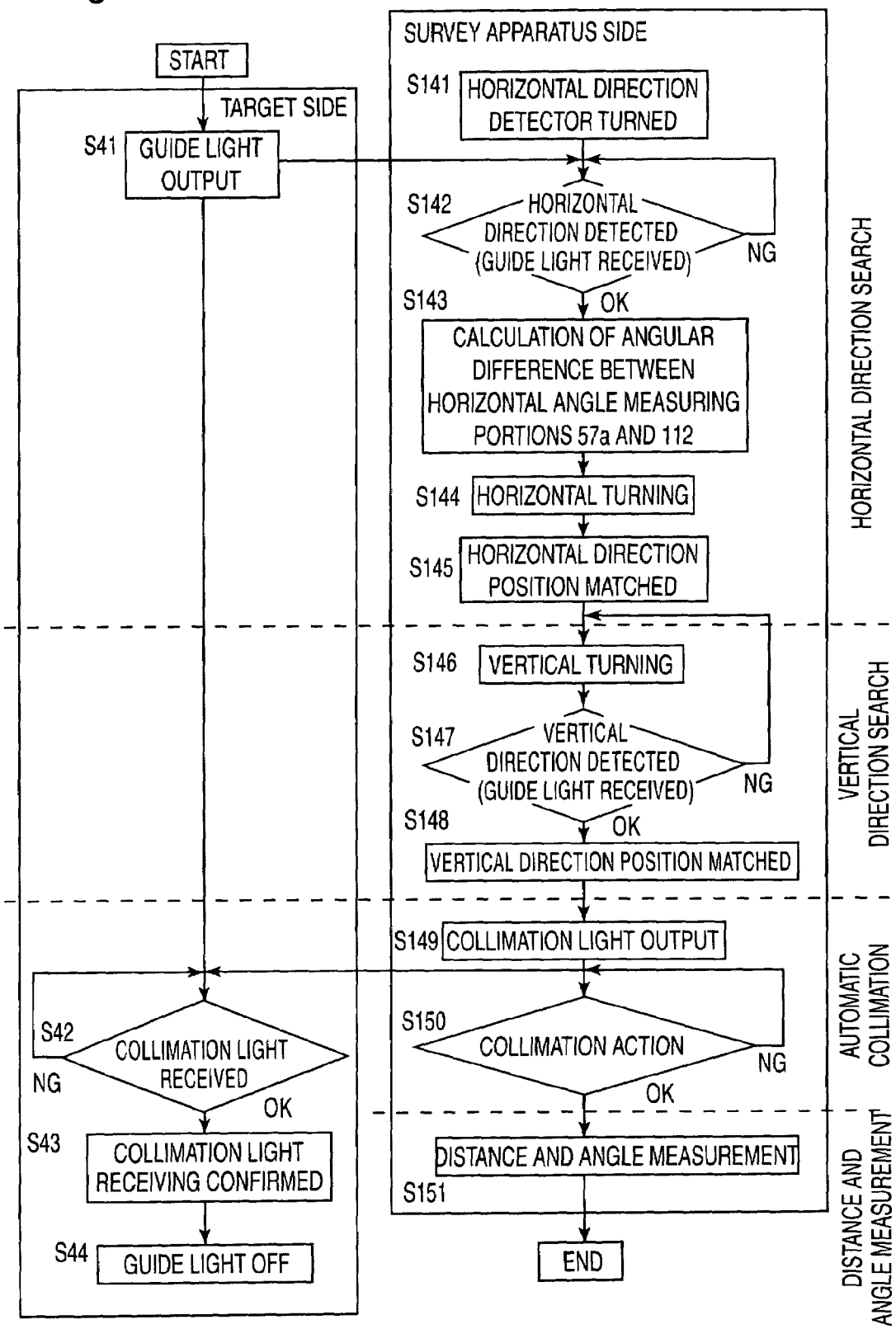
FIG. 9 is a flow chart describing movements of the survey system according to the third embodiment of the invention.

Further, a description of a third embodiment of the present invention will now be provided with reference to FIG. 7 through FIG. 9. FIG. 7 is a view showing the outline of a survey system according to the present embodiment. FIG. 8 is a block diagram showing the survey system. FIG. 9 is a flow chart describing movements of the survey system.

As shown in FIG. 7 and FIG. 8, in the survey system according to the present embodiment, the survey apparatus 50 and target 60 are not provided with any radio. A horizontal direction detector 55 for detecting the horizontal direction of the telescope 54 is connected to the control calculating portion 100. The horizontal direction detector 55 comprises a horizontal direction detector 56a, which is able to horizontally turn on the survey apparatus body 52, for receiving guide light 64 from the target 60, an encoder 57a for the horizontal direction detector, which detects the turning angle of the horizontal direction detector 56a and a horizontal angle measuring portion 57b for the horizontal direction detector, a motor 55a for the horizontal direction detector, which horizontally turns the horizontal direction detector 56a, and a drive portion 55b for the horizontal direction detector. In this case, the horizontal direction detector 56a provides a cylindrical lens (not illustrated), one rectangular light receiving sensor and slits for limiting the horizontal light receiving range in the vertical direction as in the first and second embodiments, wherein it is possible to detect the direction of the guide light transmitter 66 even if there is an error in height between the survey apparatus 50 and the target 60. Also, a vertical direction detector 56b for receiving the guide light 64 from the guide light transmitter 66 is fixed on the telescope 54. In this case, the vertical direction detector 56b comprises a convex lens (not illustrated), one light receiving sensor, and a mask, which is configured so that it becomes possible to detect the direction of the guide light transmitter 66 by turning of the telescope 54.

And, the survey apparatus body 52 turns by only a difference in detection angle between the horizontal angle measuring portion 112 and the angle measuring portion 57b for the horizontal direction detector, and turns the telescope 54 toward the target 60. The turning of the survey apparatus body 52 is carried out, as shown in FIG. 8, by the horizontal direction detector 56a, horizontal drive portion 104, horizontal motor 102, horizontal encoder 111, and horizontal angle measuring portion 112. Excepting these points, the third embodiment is the same as the second embodiment. Therefore, in FIG. 7 and FIG. 8, parts which are the same as those described with respect to the second embodiment are referred to by the same reference numbers. A detailed description of the parts which are the same will not be repeated here.

A description of movements of the survey system according to the present embodiment will now be provided with reference to FIG. 9.

When the survey system according to the present embodiment is started, the target 60 advances to Step S1 and emits guide light 64 from the guide light transmitter 66. The survey apparatus 50 advances to Step S141, and turns the horizontal direction detector 56a.

Next, the survey apparatus 50 advances to Step S142, and judges by means of the horizontal direction detector 56a whether or not the guide light 64 is received. When no guide light is received, Step S142 is repeated. However, when the guide light 64 is received, the process advances to Step S143, wherein a difference in detection angle between the horizontal angle measuring portion 112 and the angle measuring portion 57b for the horizontal direction detector is calculated. Accordingly, the process advances to Step S144, wherein the survey apparatus body 52 is horizontally turned by a difference in angle between both the angle measuring portions 112 and 57b, and the process advances to Step S145, wherein matching of the positions in the horizontal direction is completed, by which the telescope 54 is turned toward the guide light transmitter 66.

Next, the process advances to Step S146, wherein the telescope 54 is vertically turned. Further, the process advances to S147, wherein the guide light 64 is detected by the vertical direction detector 56b. If no guide light 64 is detected, the process returns to Step S146. However, when the guide light 64 is detected, the process advances to Step S148, wherein matching of the positions in the vertical direction is carried out, by which the telescope 54 is turned toward the direction of the guide light transmitter 66.

Next, the process advances to Step S149, and collimation light 58 is emitted from the survey apparatus 50 side. Continuously, the process advances to Step S150, wherein the automatic collimation device is started. Step S150 is repeated until the automatic collimation is completed. When the automatic collimation is completed, the process advances to Step S151, wherein distance and angle measurements are carried out, and the survey is finished.

On the other hand, the target 60 judges in Step S42 whether or not the collimation light 58 is received after commencing emission of guide light in Step S41. And, when no collimation light 58 is received, Step S42 is repeated, and when the collimation light 58 is received, the process advances to Step S43, wherein when it is confirmed that the collimation light 58 has been received, the collimation preparation is completed and it is found that the automatic collimation device has started. Therefore, the process advances to Step S44, wherein the guide light 64 is turned off, and the operation is stopped.

Since, in the present embodiment, the horizontal direction of the guide light transmitter 66 is detected by turning the small horizontal direction detector 56a, it is possible to quickly carry out the horizontal direction detection, wherein the time required for the entire survey can be further shortened. Also, since no radio communication is carried out between the survey apparatus 50 and the target 60, it is possible to utilize the survey system in an environment where electromagnetic noise exists.

Figure 10:
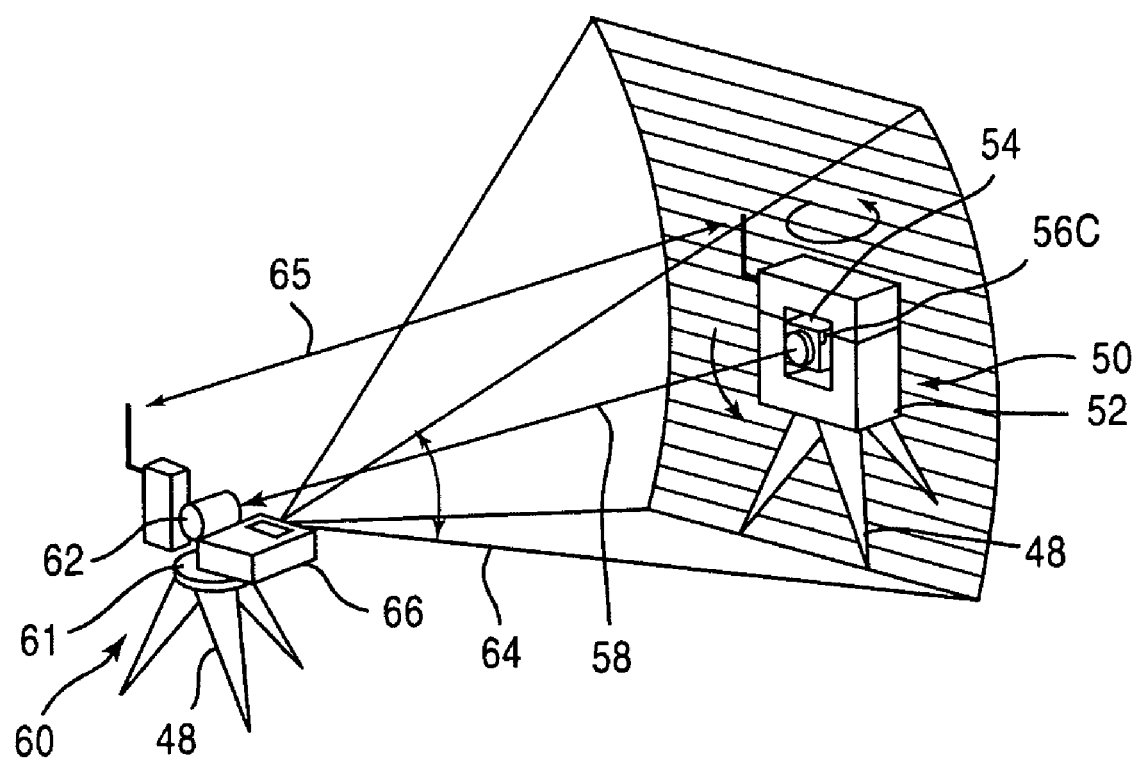
FIG. 10 is a view showing the outline of a survey system according to a fourth embodiment of the invention.
Figure 11:
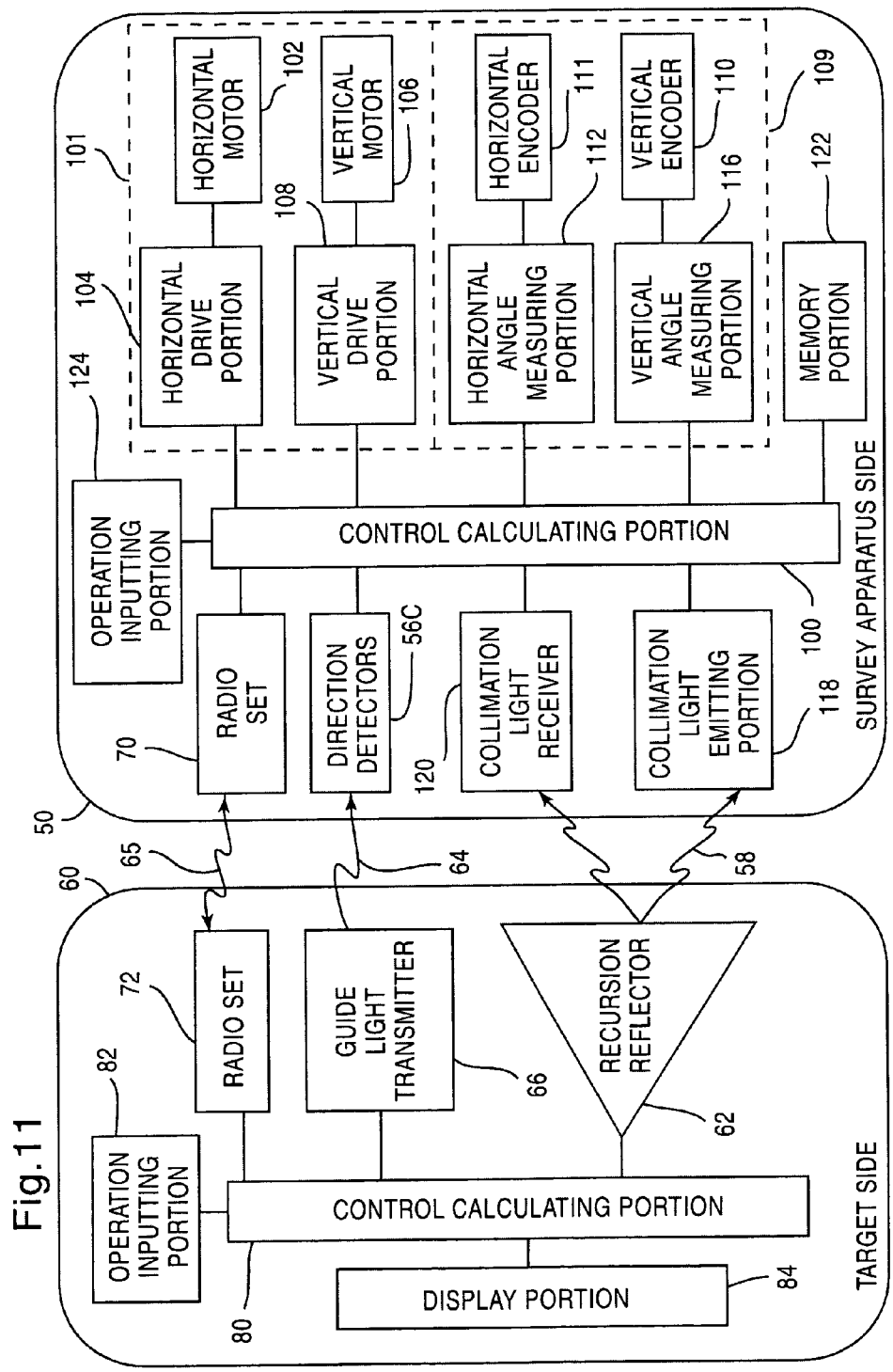
FIG. 11 is a block diagram showing the survey system according to the fourth embodiment of the invention.
Figure 12A:
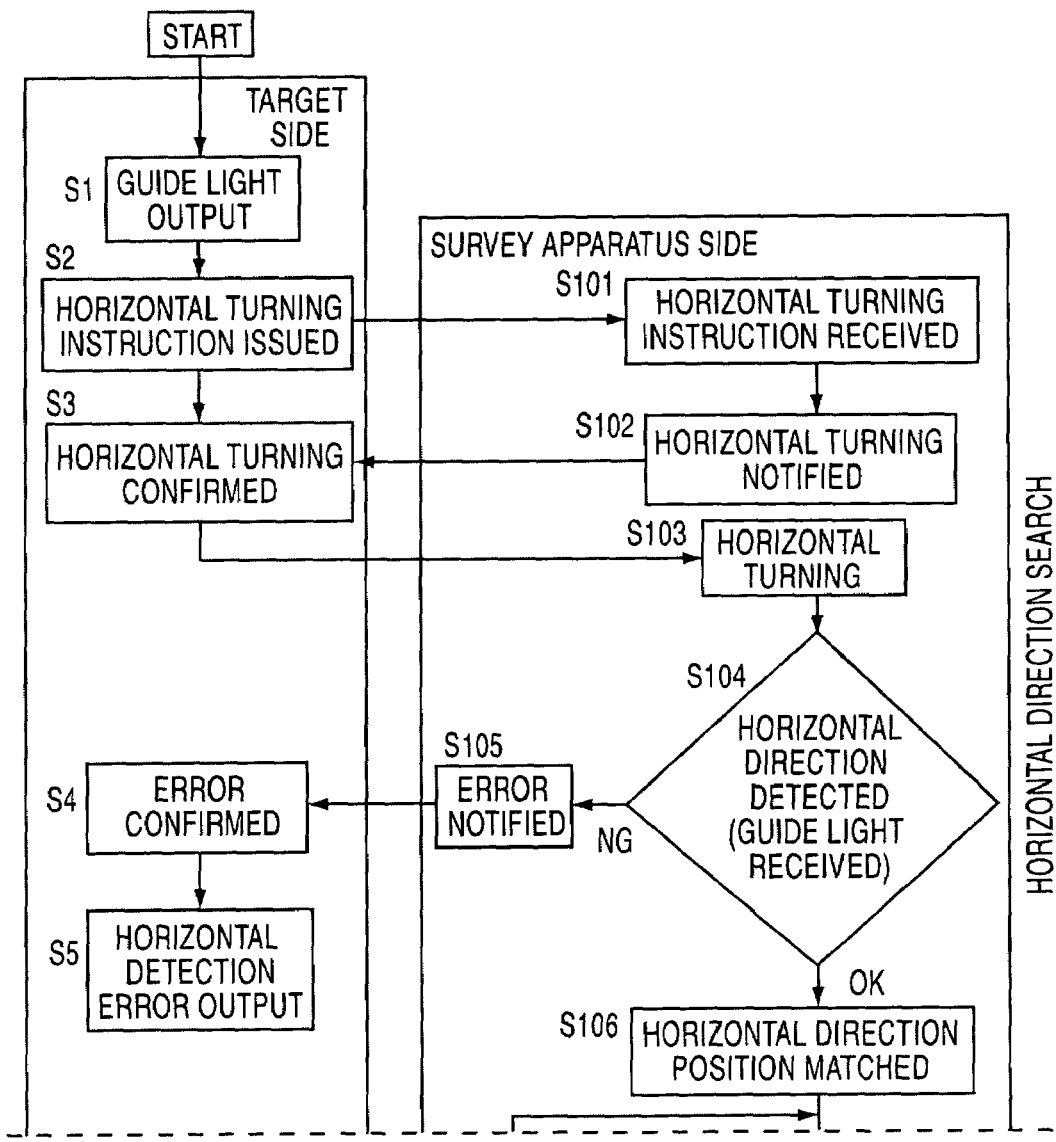
FIGS. 12A and 12B are a flow chart describing movements of the survey system according to the fourth embodiment of the invention.
Figure 12B:
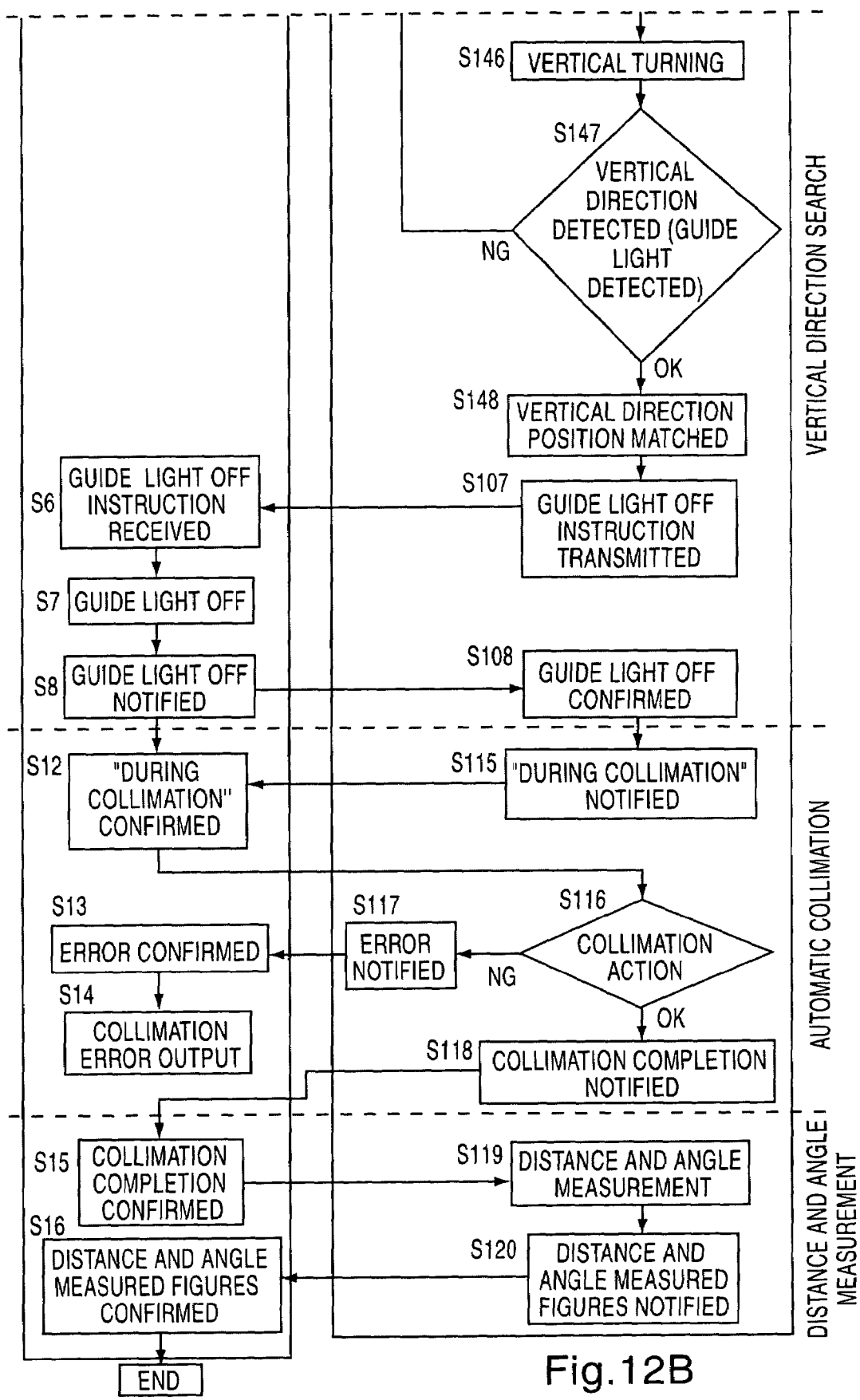
Figure 13:
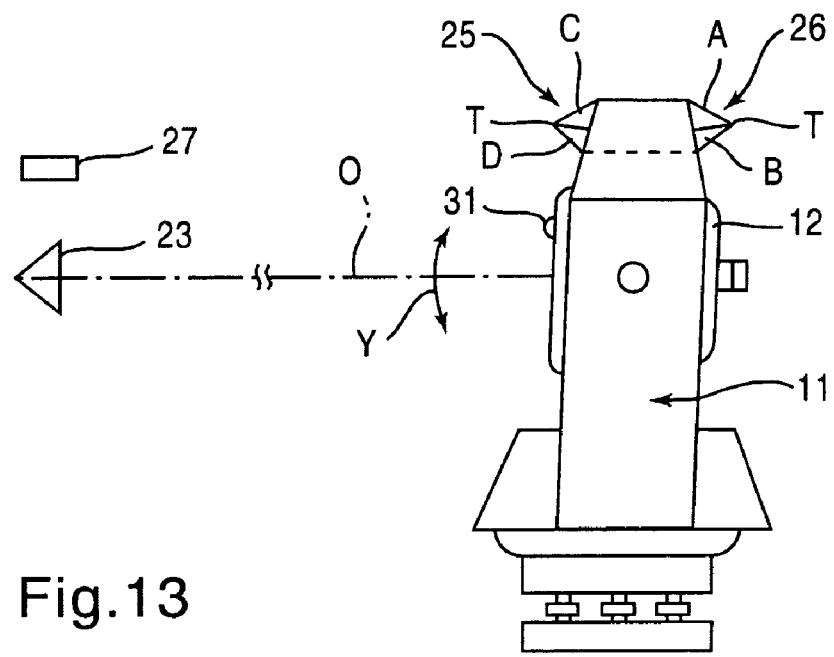
FIG. 13 is a view showing a survey apparatus having a prior art remote controller
Figure 14:
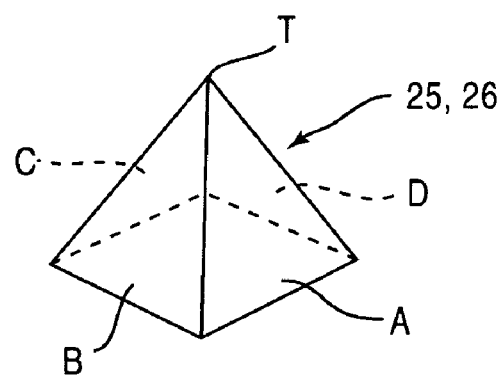
FIG. 14 is a perspective view of a light-receiving unit employed in the above-described prior art survey apparatus.

Further, a description of a fourth embodiment of the present invention will now be provided with reference to FIG. 10 through FIGS. 12A and 12B. FIG. 10 is a view showing the outline of a survey system according to the present embodiment, FIG. 11 is a block diagram of the survey system, and FIGS. 12A and 12B are a flow chart describing the movements of the survey system.

As shown in FIG. 10 and FIG. 11, in the survey system according to the present embodiment, no direction detector 56 is provided in the survey apparatus body 52, but a direction detector 56c is fixed in the telescope 54, and the direction detector 56c comprises a convex lens (not illustrated), a mask and one light receiving sensor, wherein the direction of the guide light transmitter 66 can be detected by turning of the telescope 54. Excepting these points, the fourth embodiment is the same as the first embodiment. Therefore, in FIG. 10 and FIG. 11, parts which are the same as those described with respect to the first embodiment are given the same reference numbers. A detailed description of the parts which are the same will not be provided here.

A description of movements of the survey system according to the present embodiment will now be provided with reference to FIGS. 12A and 12B. The processes from Step S1 to Step S106 are similar to those from Step S1 to Step S106 in the first embodiment (Refer to FIGS. 3A and 3B), wherein the position of the telescope 54 in the horizontal direction is matched by horizontally turning the survey apparatus body 52.

Next, the processes from Step S146 to Step S148 are similar to those from Step S146 to Step S148 in the above-described third embodiment (Refer to FIG. 9), wherein guide light 64 coming from the target 60 side is received by vertically turning the telescope 54, the vertical direction of the guide light transmitter 66 is detected, and the position of the telescope 54 in the vertical direction is roughly matched.

Next, the processes of Steps S107 and S108 are similar to those of Steps S107 and S108 in the above-described first embodiment (Refer to FIGS. 3A and 3B), wherein when collimation preparation is roughly finished, a guide light OFF instruction is emitted from the survey apparatus 50 side to the target 60 side by radio 65 (S107 and S6), the guide light is turned off (S8), and it is notified from the target 60 side to the survey apparatus 50 side that the guide light 64 is turned off (S8 and S108). And, the processes after Step S115 are similar to those after Step S115 in the first embodiment (Refer to FIGS. 3A and 3B), wherein automatic collimation, distance measurement and angle measurement are carried out.

Since, in the present embodiment, collimation preparation in which the position of the telescope 54 is matched, the guide light transmitter with respect to both the horizontal direction and vertical direction is carried out by using the guide light 64 emitted from the guide light transmitter 66, it is possible to further quickly and securely perform automatic collimation.

Although preferred embodiments of the present invention have been shown and described, it will be appreciated by those skilled in the art that the present invention is not limited to these embodiments, and various changes and modifications may be made in these embodiments without departing from the principals and spirit of the invention, the scope of which is defined in the appended claims and their equivalents.

For example, although, in the respective embodiments described above, a fan beam being wide in the horizontal direction and narrow in the vertical is scanned in the vertical direction as guide light 64, the guide light 64 may be any type of beam as long as a fan beam being wide in the width direction and narrow in the thickness direction is scanned in a direction differing from the width direction. For example, the guide light may be light in which a fan beam being wide in the vertical direction and narrow in the horizontal direction is scanned in the horizontal direction. Also, an infrared ray, visible light beam or wired communication may be employed in addition to electric waves as communication means between the survey apparatus 50 and the target 60.

What is claimed is:

1. A survey system, comprising:
a target provided with a recursion reflector for reflecting light in a direction from which the light comes; and
a survey apparatus provided with an automatic collimating device for automatically coinciding a collimation axis of said recursion reflector with that of a telescope,
wherein said target is provided with a guide light transmitter for emitting guide light showing the direction of the guide light transmitter, and
said survey apparatus includes collimation preparing means having a direction detector for detecting the direction of said guide light transmitter by receiving said guide light and turning said telescope toward the direction of said recursion reflector on the basis of an output signal from said direction detector before starting said automatic collimating device; and
said guide light transmitter scans a fan beam that is wide in a width direction and narrow in a thickness direction in a direction differing from the width direction as guide light.

2. A survey system as set forth in claim 1, wherein said guide light transmitter scans a fan beam that is wide in the horizontal direction and having a vertically narrow width in a vertical direction as guide light, and
said direction director is fixed on the survey apparatus body and is a horizontal direction detector that detects the horizontal direction of said guide light transmitter when turning said survey apparatus in the horizontal direction.

3. A survey system as set forth in claim 2, wherein said survey apparatus emits collimation light from said automatic collimating device when said horizontal direction detector receives guide light from said guide light transmitter, and simultaneously turns the telescope vertically; and
said target includes a collimation light receiver for receiving said collimation light and a control calculation portion for controlling so as to turn on and off the guide light, which is emitted from said guide light transmitter, in response to an output from the corresponding collimation light receiver.

4. A survey system as set forth in claim 3, wherein said target is connected to said survey apparatus by communication means.

5. A survey system as set forth in claim 2, wherein said target is connected to said survey apparatus by communication means.

6. A survey system as set forth in claim 1, wherein said guide light transmitter scans a fan beam that is wide in the horizontal direction and having a vertically narrow width in the vertical direction as guide light; and
said direction detector is fixed on the telescope axially supported on said survey apparatus so as to rotate vertically, and detects the horizontal direction of said guide light transmitter when horizontally turning said survey apparatus and detects the vertical direction of said guide light transmitter when vertically turning said telescope.

7. A survey system as set forth in claim 6, wherein said target is connected to said survey apparatus by communication means.

8. A survey system as set forth in claim 1, wherein said target is connected to said survey apparatus by communication means.

9. A survey system as set forth in claim 1, wherein said guide light transmitter scans a fan beam that is wide in the horizontal direction and having a vertically narrow width in the vertical direction as guide light;

said direction detector comprises a horizontal direction detector, which is horizontally rotatably attached to said survey apparatus body, for detecting the horizontal direction of said guide light transmitter by turning in the horizontal direction, and a vertical direction detector, which is fixed on the telescope fixed on said survey apparatus body so as to rotate vertically, for detecting the vertical direction of said guide light transmitter when said telescope is vertically rotated; and said target comprises a collimation light receiver for receiving collimation light emitted from said automatic collimation apparatus and a control calculation portion for stopping said guide light when the corresponding collimation light receiver receives said collimation light.

* * * * *